March 2, 1943.　　　H. B. PALMER　　　2,312,773
EDUCATIONAL TOY
Filed April 30, 1941
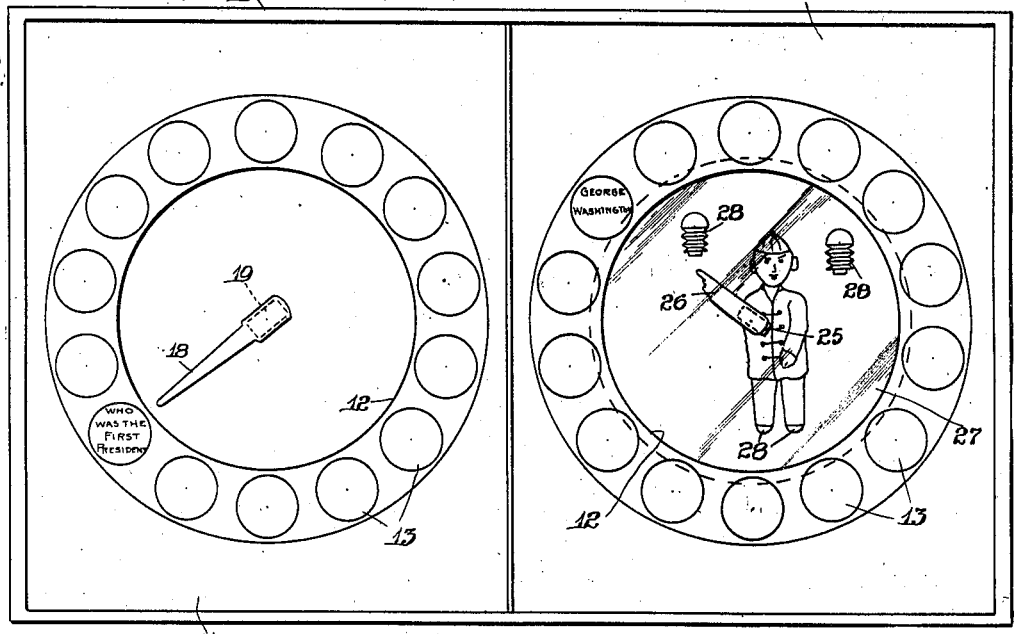
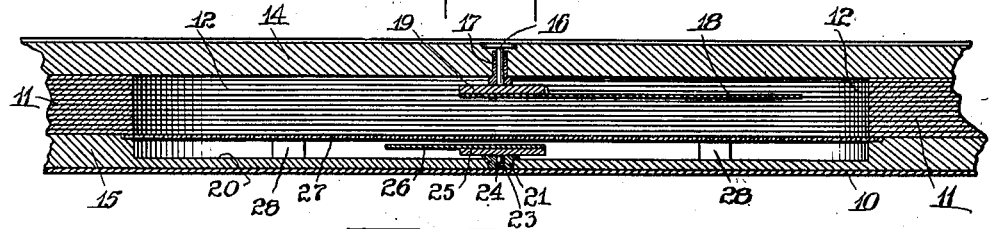
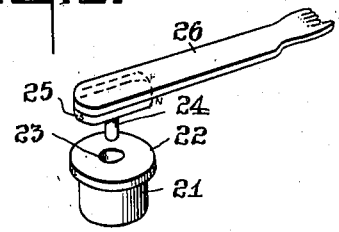
Harry B. Palmer
INVENTOR
BY
his ATTORNEY Patented Mar. 2, 1943

2,312,773

UNITED STATES PATENT OFFICE 2,312,773

EDUCATIONAL TOY

Harry B. Palmer, New York, N. Y.

Application April 30, 1941, Serial No. 391,041

2 Claims. (Cl. 35—9)

My invention relates to certain improvements in educational toys of the character disclosed in my Letters Patent No. 948,633, of February 8, 1910, and has reference particularly to an improved means of supporting and housing the magnetically operated pointer to insure more accurate functioning thereof.

The object of the invention is to mount the magnetically operated pointer of a toy of this character so as to allow the pointer to be simultaneously freed of its bearing and caused to rotate under the magnetic attraction set up by an adjustable pointer when the latter is superimposed over the first pointer.

A further object of the invention is to provide a transparent cover for the housing of the magnetically operated pointer, whereby when the latter is elevated and freed of its bearing by the pull of the adjustable magnet pointer, it will be prevented from becoming entirely disengaged from its bearing by abutting the transparent cover.

I accomplish these objects by means of the embodiment of my invention hereinafter described, set forth in the appended claims and illustratively exemplified in the accompany drawing, in which:

Figure 1 is a plan view of my improved toy;

Figure 2 is a substantially longitudinal sectional view of the toy with the covers closed and the pointers in superimposed position;

Figure 3 is a perspective view of the magnetically operated pointer and its bearing.

Referring to the drawing, 10 denotes a box and 11 the leaves of a book. The leaves 11 are provided with center openings 12 about which are printed a circular series of subdivisions 13. The subdivisions on one side of a page contain the questions and on the opposite side the answers. The leaves 11 are bound in any suitable manner between two covers 14 and 15. The cover 14 carries axially of the openings 12 of the pages 11 a bearing 16 upon which the hub 17 of a pointer 18 is rotatably mounted. The inner end of the pointer 18 carries a small permanent magnet 19, the poles of which are arranged on opposite sides of the bearing 16. The pointer 18 is turned to indicate any one of the questions contained in the subdivisions 13.

The cover 15 is actually the back of the book and is provided with a suitable recess 20 coaxial of the center openings 12 of the leaves 11 when the latter are placed over the cover or when the book is closed, as in Figure 2. In the center of the recess 20 and embedded in the cover 15 is a bearing plug 21 of non-magnetic material having a flanged upper end 22 to rest upon the bottom of the recess and a bore 23 opening out of the upper flanged end and serving as a bearing for a shaft 24. The upper end of the shaft 24 carries a permanent magnet 25 and pointer 26.

According to the present invention, the shaft 24 fits very loosely in the bore 23 so as to allow practically no frictional engagement between shaft and bearing 21 and to permit the pointer 26, magnet 25 and shaft 24 to be lifted perpendicularly of the bearing. In order to prevent the pointer 26 from being lifted too far and becoming disengaged entirely from its bearing, a transparent cover plate 27 is permanently fixed over the recess 20, the cover being spaced above the pointer sufficiently to allow the same to rise slightly and free itself of actual contact with the bearing 21, but not far enough to permit the lower end of the shaft 24 to entirely free itself of the bore 23. The poles of the magnet 25 are arranged directly opposite with respect to the pointer 26 from those of the magnet 19 of pointer 18. The transparent plate 27 is supported at several points by blocks 28 carried on the bottom of the recess 20.

In practice, the toy is operated as follows:

The pointer 18 is moved by hand to indicate any desired question in one of the subdivisions 13. The book is then closed and placed in a horizontal position, whereupon the magnet 25 will change its position to correspond with the position of the magnet 19; i. e., the magnet 25 will be lifted free of the bearing 21 and against the cover 27 and caused to rotate into a position parallel with the magnet 19, bringing the pointer 26 opposite the desired answer which will be visible when the book is again opened, the opening of the book, of course, relieving the magnetic attraction between the two magnets and allowing the pointer 26 to drop back into its bearing to remain in the position to which it moved.

From the foregoing it will be appreciated that I have greatly improved the mounting of the magnetically movable pointer 26 to insure free movement thereof to proper position without the use of counter-balancing weights and other means to aid in permitting the pointer to turn properly, as utilized in the construction of the device in U. S. Patent 948,633.

What I claim and desire to secure by Letters Patent is:

1. In a toy of the character described, a magnetically operated pointer having a shaft, a bearing loosely receiving said shaft to permit both rotary and axial movement of said pointer, and means limiting the axial movement of the pointer to prevent said shaft from being completely withdrawn from said bearing.

2. A toy as claimed in claim 1 in which said means for limiting the axial movement of said pointer comprises a transparent plate mounted at a predetermined distance above said pointer.

HARRY B. PALMER.